Feb. 8, 1955 R. E. DAY 2,701,444
BURNER FOR JET ENGINES
Filed Jan. 26, 1950 6 Sheets-Sheet 1

INVENTOR
Robert E. Day
By Strauch, Nolan + Diggins
Attorneys

INVENTOR
Robert E. Day

Feb. 8, 1955 R. E. DAY 2,701,444
BURNER FOR JET ENGINES
Filed Jan. 26, 1950 6 Sheets-Sheet 6

INVENTOR
Robert E. Day
By Strauch, Nolan & Diggins
Attorneys

2,701,444
Patented Feb. 8, 1955

United States Patent Office

2,701,444

BURNER FOR JET ENGINES

Robert E. Day, San Diego, Calif., assignor to Solar Aircraft Company, San Diego, Calif., a corporation of California Application January 26, 1950, Serial No. 140,633

16 Claims. (Cl. 60—39.71)

This invention relates to improvements in burners for burning fuel in a high velocity duct, and in particular to a burner for continuously burning a mixture of combustible and combustion supporting elements in a high velocity stream to develop reactive forces in, and to increase the reactive forces of the stream under widely varying altitude and ambient pressure conditions.

The exhaust gases of an internal combustion engine mounted in an airplane exert a definite thrust tending to force the airplane forward when these gases are directed rearwardly with a velocity greater than the forward speed of the airplane. In the case of so-called jet engines and ram jets the entire thrust that forces the airplane through the air comes from the reaction of these rearwardly directed and heated gases. In engines combining a propeller drive with a jet drive the thrust is the sum of those provided by the propeller and the jet. In the reciprocating piston types of internal combustion engines, the exhaust gases periodically include a high proportion of unburned fuel components. In the case of turbo-jet engines the exhaust gases include a large amount of surplus air, above that required for combustion, which is passed through the engine to keep the temperature of the burning gases down to safe operating values for the rotating turbine blades.

It has been known that the thrust effect of the exhaust gases may be increased by increasing their temperature, thus increasing their velocity. Consequently, in recent years, attention has been turned toward this means for further increasing the performance and output of a given size engine. The first successful method of augmenting thrust of an exhaust stream to increase the speed of an airplane is disclosed in application Serial No. 628,108 filed November 12, 1945, by Paul A. Pitt for Method of and Apparatus for Augmenting Mass and Velocity of an Exhaust Stream, in which the unburned components of the exhaust gases are burned to provide the major increase in their temperature by burning additional fuel and air with the unburned exhaust gases, thus increasing not only the temperature but also the mass of the exhaust gases. An improvement over the burner of said application Serial No. 628,108 is disclosed in copending application of R. E. Day and F. J. Hill, Serial No. 12,246 filed March 1, 1948, for Afterburner, utilizes surplus air to burn the unburned exhaust gas components and additional fuel admixed with the exhaust gases to enrich them and to provide an igniting and combustion sustaining flame.

The present application relates to an improved burner and methods of operation primarily intended to be used to increase the reactive thrust of exhaust gases at altitudes from sea level to 42,000 feet and higher, by burning additional fuel in the exhaust gases, thereby igniting and burning unburned components in the exhaust gases, although it may be used to increase the temperature, mass and velocity of any confined stream of gas moving at high speeds of, for example, up to 300 miles per hour and faster. When used to increase the reactive thrust of exhaust gases it is conventionally called an afterburner, and the burned disclosed herein is an improvement over that shown in said application Serial No. 12,246.

In an ordinary burner for liquid or gaseous fuel, ambient entrained air and substantial pressure drop play a major role in promoting steady flame and a rapid readjustment of flame pattern after being upset by adverse drafts or the like. Flames in successful ram jet burners and afterburners on the other hand must live in hyper hurricane velocities of 300 miles an hour and higher. In such burners the combustion components are in a confined space and do not meet with stabilizing ambient air, and problems are encountered that are not encountered in burners of any other type. There is not only the problem of igniting and maintaining a steadily burning flame in the high velocity flow of gases, but also of igniting and burning the unburned components within the flowing mixture without detonation in the tail pipe and before they are discharged into the ambient air. Even low grade explosions, as for example those which occur in a plumber's blow torch, would be intolerable in an engine tail pipe where the cross-sectional area of the stream of gases is 900 or more times the cross-sectional area of the stream of gases issuing from a blow torch.

It is believed that in flame propagation in high velocity gaseous streams, roughness verging on low grade detonation is produced by areas of unburned molecules becoming over mature and overripe before having come into contact with a kindling flame. Maturing may be defined as including the intimate mixing of fuel and oxidizer, and the activation and intermolecular association which may be considered as preceding combustion. This may occur at almost any point in a relatively unstable flame and is not confined to points in advance of the flame front. Consequently, in order to provide a stable flame in a high speed confined gaseous stream it is important to ignite portions of the mixture as soon as they have matured and reached the kindling point, with the other portions being burned as soon as they thereafter reach the kindling point, but without allowing any parts of the mixture to overripen into a violently explosive mixture, so that roughness due to low grade explosions within the flame itself are avoided.

In the aforesaid applications Serial Numbers 628,108 and 12,246 are disclosed what are believed to be the first successful systems for so called afterburning, and the afterburners disclosed therein successfully control the flame pattern and avoid roughness and detonation by stratifying the mixture of exhaust gases, and additional fuel and/or air so that that portion of the mixture which first becomes matured is ignited by a continuously burning encircling pilot flame, and the remaining portion of the mixture is burned as it matures downstream and transversely of the pilot flame itself, and of the structure which protects the pilot flame from being extinguished by the gaseous blast.

The burners disclosed herein are a substantial improvement over that disclosed in said application 12,246 in providing smooth combustion of substantially increased fuel volume in a burner of given size at all altitudes up to at least 42,000 feet, with much less downstream turbulence and a longer more stable flame pattern surrounded by a zone of relatively cool gases which acts in a measure as insulation for the outer wall, permitting use of considerably hotter flames without overheating outer burner wall or the downstream combustion chamber wall.

The fuel is distributed in such manner that adequate pre-combustion mixing time is provided even at maximum air stream and plane speeds. This has been accomplished in preferred embodiments of my invention by injecting the main fuel supply generally upstream, and pilot fuel either downstream or upstream and passing the resulting fuel mixture through a compound gutter structure having carburetion troughs or gutters facing upstream, and relatively deep combustion troughs or gutters facing downstream. When the pilot fuel is directed downstream it is heated and atomized by impact against the upstream facing or carburetion gutter and then passes in a highly combustible mixture through a common wall into the downstream facing or combustion gutter. When the pilot fuel is directed upstream, which is preferred for high altitude operation, it is carried back into the carburetion gutters. From the carburetion gutters it passes through passes into the combustion gutter or pilot flame holders in jets of highly combustible mixture which impinge on the combustion gutter side walls This impingement has a major part in initiating and sustaining stable combustion, and in operation results in a bluish flame of singular stability.

As will be further explained as the description progresses, the fuel distributor grid is so constructed that it completely overlies the carburetion gutter, and the ripened pilot fuel mixture passes into the carburetion gutter from holes in the fuel distribution grid either facing or directed away from the carburetion gutters. Those sections of piping of the fuel distribution grid that overlie the carburetion gutter in either case preferably have upstream facing openings that discharge the main fuel supply generally upstream. While some of the fuel in one embodiment is directed into the open spaces between the carburetion gutters or pilot flame holders for high altitude operation I prefer to direct all of the pilot fuel upstream in such manner that the pilot fuel mixture tends to draw back into the gutter without substantial bridging over the gutter sides into the spaces between gutters. Sections of piping of the fuel distribution grid may also bridge the open spaces between the carburetion gutters or flame holders and have upstream openings to discharge fuel upstream in these spaces.

Many substantial advantages result from the use of the improved burner, including lesser solidity or flow resistance; greater preheating of the fuel prior to its entrance into the combustion gutter or flame holder; greater uniformity of combustible material within the gutter; more intimate mixing of fuel and combustion supporting components by entrainment when passing through the holes connecting the carburetion and combustion gutters; a greater time-delay allowing for more thorough intermolecular regrouping; development of long stable igniting or pilot and combustion maintaining flame plumes adjacent primary fuel mixing and combustion areas; improved mixture stratification; more smooth stable combustion; greater fuel burning capacity with hotter flame combustion; and protection of the skin or shell against over-heating by an outer layer or zone of relatively cool gases.

While the embodiment shown for purposes of illustration includes spark plugs for igniting the afterburner fuel it is to be understood that this is by way of illustration only, since obviously other methods of initial ignition may be utilized, such as continuously burning pilot flames, hot wires or the like. Also, the afterburner may be initially ignited in accordance with the system shown in the copending application Serial No. 706,266 filed October 28, 1946, now Patent No. 2,636,344, in which fuel injected downstream of the primary combustion zone results in a flame from the primary burner which reaches and ignites the afterburner.

It is therefore a primary object of my invention to provide a new and improved burner for augmenting the temperature, mass and velocity of a confined blast of gases moving at high velocity.

Another important object of my invention is the provision of a new and improved afterburner construction for burning combustible elements in the exhaust gas stream from an internal combustion engine.

It is another important object of my invention to provide a new and improved burner gridwork structure which combines the functions of carbureting the fuel-gas mixture and burning a primary or pilot flame in a sheltered zone in a blast of gases moving at high velocity.

A further object of the invention is the provision of an afterburner structure of relatively reduced solidity and resistance to flow, particularly during periods of no afterburning.

A still further object is the provision of an improved afterburner in which the flow turbulence is reduced or minimized, thus exposing the afterburner walls to less heat, thereby allowing substantially increased fuel burning capacity without serious overheating of the wall structure.

Another object is the steadying or stabilization of flame and flame pattern in afterburners, accomplishing improved flame holding structure with impingement of combustible vapor against heated surfaces thereof which results in marked improvement in smoothness of combustion particularly at very high altitudes.

Other objects will become apparent as the description proceeds in connection with the accompanying drawings, wherein.

Figure 1:
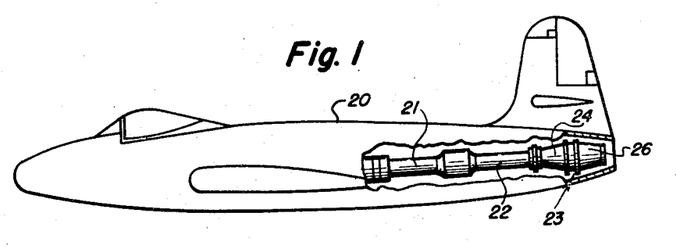
Figure 1 is a side elevation of an airplane partly in section showing the location of my improved burner.
Figure 2:
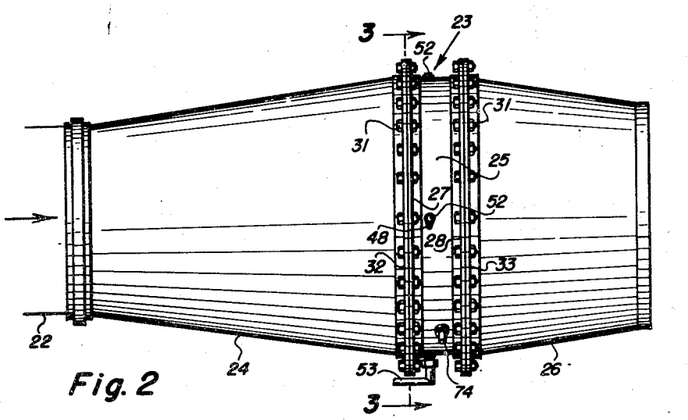
Figure 2 is an enlarged side elevation of the burner.
Figures 3, 5, 7, 15:
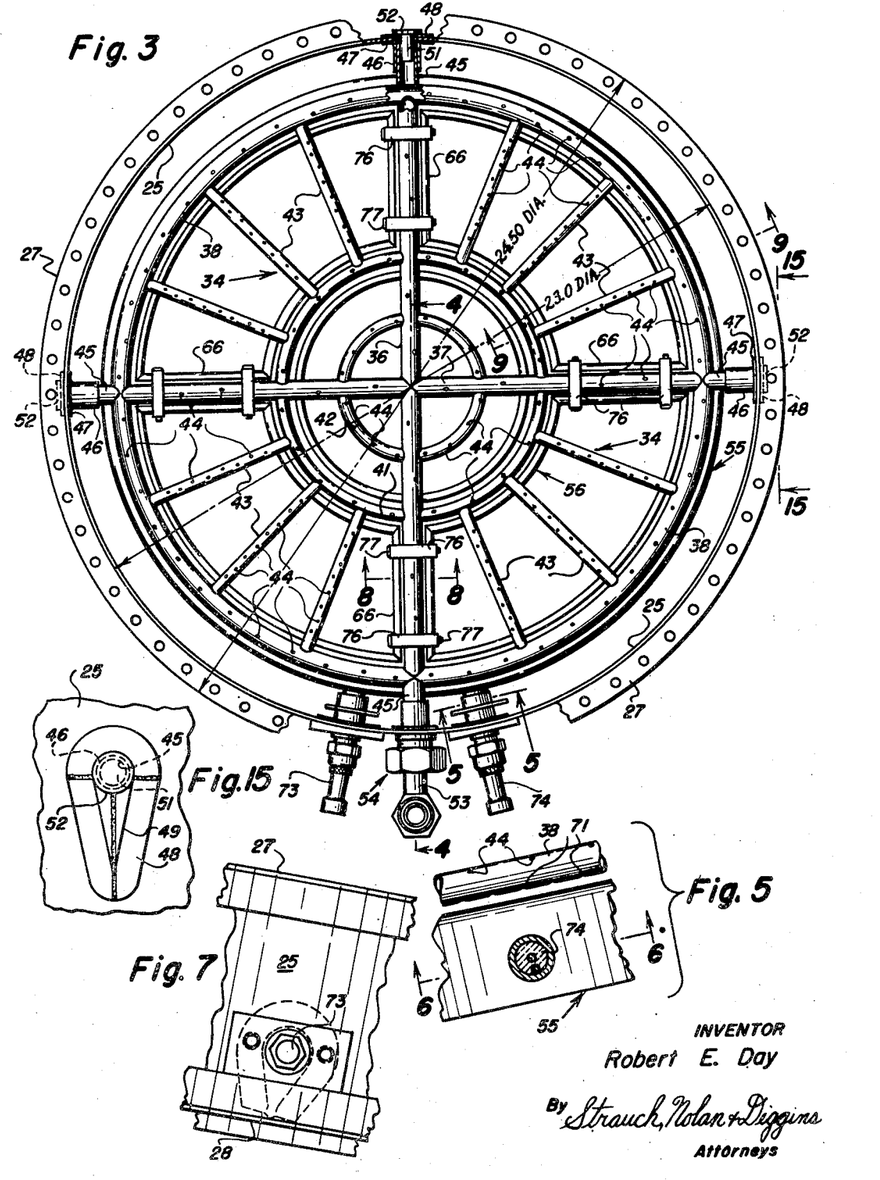
Figure 3 is a front view of the burner taken on line 3—3 of Figure 2.
Figure 5 is a fragmentary sectional view on line 5—5 of Figure 3.
Figure 7 is a side elevation of a portion of the burner.
Figure 15 is a fragmental view substantially along line 15—15 of Figure 3, showing streamlining details.

Referring to Figures 1 and 2 of the drawings, reference number 20 indicates an airplane fuselage wherein is mounted a combustion engine 21 which may be of the turbo-jet type. The exhaust tail pipe is indicated at 22 and my burner assembly installed as an afterburner is indicated generally at 23. The tail pipe 22 is shortened so that it does not extend to the rear end of the fuselage thereby providing room for the afterburner assembly which as shown replaces the rear end portion of the normal tail pipe. In the arrangement disclosed, an expanding section 24 (Fig. 2) is secured to the end of the tail pipe at one end and to a burner section or shell 25 at its other end. Section 24 conducts the gases from the engine 21 to the afterburner at a speed for proper flame propagation and stabilization. Converging section 26 has an outlet diameter larger than the diameter of the normal tail pipe to provide sufficient cross sectional area at the outlet to take care of the increased volume of discharge gases caused by any additional burning of the exhaust gases and of the fuel added in the afterburner itself. An adjustable discharge orifice (not shown) at the outlet of the converging section is provided, such for example as shown in the aforesaid application Serial No. 12,246 so that the effective outlet diameter can be reduced when the afterburner is not in operation. Instead of the two position adjustable orifice shown in Serial No. 12,246 it will be understood that a continuously variable orifice, of any suitable type, may be used. Also, in order to keep the temperature of the converging section 26 within a safe maximum, a shroud (not shown) may be used to enclose section 26 to direct cooling air over it, as also shown in the aforesaid application Serial No. 12,246. The variable outlet orifice structure and the cooling shroud are not shown here because they do not form any part of the instant invention, all of which is contained within the afterburner itself, housed within the cylindrical burner section or shell 25.

Referring to Figures 2, 3, 4 and 9, expanding shell sections 24 and 26 are secured to cylindrical shell 25 through a pair of peripheral welded flanges 27 and 28 by means of bolts 31 and complementary flanges 32 and 33 welded to sections 24 and 26 respectively. Within the shell 25 are disposed the fuel distribution grid indicated generally at 34, and the grid formed by the compound carbureting and combustion gutter, indicated generally at 35.

Both grids are sufficiently smaller in diameter than shell 25 to provide an annular area for the passage of a layer of protective gases between the burner structure and the shell which as hereinafter pointed out prevents serious overheating of the shell even when large volumes of fuel are burned. The fuel distribution grid 34 comprises an intercommunicating network of tubes or pipes, some of which are arranged concentrically within the shell 25 and others radially. In the illustrated embodiments the pipes forming the fuel distribution grid are coplanar. Referring to the first embodiment illustrated in Figure 3 etc., the grid 34 includes a diametrically extending vertical pipe 36 and a horizontal pipe 37 which extend to and communicate with a circular pipe 38. Two other circular pipes 41 and 42 connect the pipes 36 and 37 at other points, spaced inwardly and concentric with the pipe 38. A series of equiangularly spaced radial pipes 43 bridge the space between the outer circular pipe 38 and the adjacent circular pipe 41, except that there are no such radial pipes in the places already occupied by the vertical and horizontal pipes 36 and 37, since these pipes 36 and 37 already connect the circular pipes 38 and 41 at these locations. All the pipes forming the fuel distribution grid 34 have openings 44 facing generally upstream into the exhaust or other gases, i. e. toward the expanding section 24 of the afterburner assembly. While all of the holes in the pipes upstream of the carburetion gutters 63 hereinafter described may be almost parallel to the axis of the afterburner assembly, particularly for use in higher altitudes of say 42,000 feet, as in a later described embodiment, a satisfactory distribution of fuel into the stream of gases and a suitable mixture therebetween is secured at lower altitudes by having the holes in the entire fuel distribution grid 34 at an angle to the axis of the afterburner assembly so that the fuel jets or sprays are directed partially into the spaces between the pipes forming the fuel distribution grid. However, since it is only necessary that the fuel sprayed from those holes not overlying the carburetion gutter adequately cover the areas between gutters, considerable latitude is available in the selection of sizes and distribution of openings to attain the desired coverage.

The fuel distribution grid 34 is mounted within the cylindrical section or shell 25 in the following manner. At points coaxial with the vertical and horizontal pipes 36 and 37, three tubular axial extensions 45 are welded to the outer circular pipe 38. Each extension has a slip fit into a streamlined tubular socket 46 having an integral peripheral flange 47 that is welded to the shell 25. At each of these points the shell 25 is reinforced by a streamlined plate 48 (top of Figure 3) welded to the outside thereof. The extensions 45 are each further supported by a plug 51 each of which passes through the shell and has a slip fit in the open end of an extension 45, the plugs 51 each having an outer enlarged head 52 that is welded to the plate 48 through which it passes. Thus while the fuel distribution grid is rigidly located within the section 25 it is free to expand and contract with temperature changes without imposing stresses on the section 25 that might deform it. To reduce turbulence of the gases passing between the outer fuel distribution pipe 38 and the burner section or shell 25 the sockets 46 have streamlined shrouds 49 (Fig. 15) suitably affixed thereto as by welding or the like. These shrouds are important in that they reduce turbulence in the annular area surrounding the outer fuel distribution pipe 38 to provide an annular layer of relatively cool exhaust gases between the shell 25 and the flame from the afterburner. It is within the scope of the invention that the extensions 45 and sockets 46 be streamlined instead of providing a streamlined shroud 49 for the socket 46.

Fuel is fed to the grid 34 at the bottom thereof, as through an inlet pipe 53 passing through a stuffing box 54 (Figures 3 and 4) into the interior of the shell 25 and rigidly connected to the circular pipe 38 coaxially with the vertical pipe 36. The inlet pipe 53 provides the fourth radial support for the fuel distribution grid 34, and the stuffing box 54 provides for any axial movement of the inlet pipe 53 caused by expansion or contraction of the grid 34. The fuel thus enters the fuel distribution grid 34 at the bottom and rises within the intercommunicating network of pipes, filling it to the top. Any gas that was within the pipes will be completely displaced.

Figure 4:
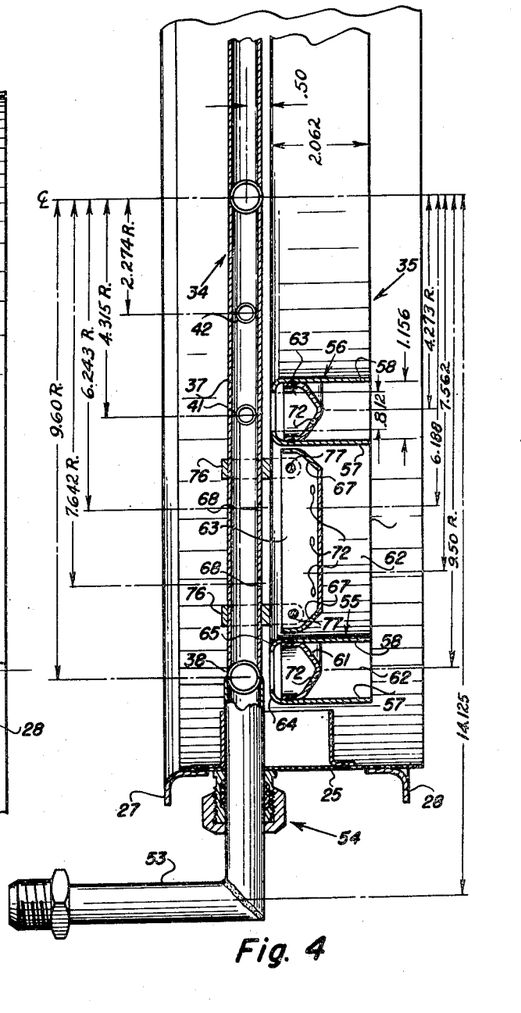
Figure 4 is a sectional view taken on line 4—4 of Figure 3.
Figure 6:
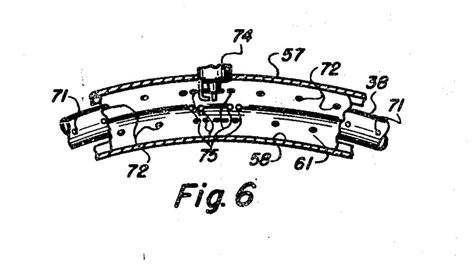
Figure 6 is a fragmentary section on line 6—6 of Figure 5.

Carried by the fuel distribution grid 34 and disposed downstream thereof, or within the portion of the shell 25 adjacent the converging section 26 is the compound carburetion and combustion gutter 35 which forms another network or grid. This gutter 35 is arranged transversely of the shell 25 as is the fuel distribution grid 34, and in the illustrated embodiments is planar and parallel to the fuel distribution grid. The compound gutter is made up of several portions, substantially identical in cross section as appears in Figures 4, 9 and 10, and positioned directly downstream of several elements of the pipes forming the fuel distribution grid 34. It comprises an outer ring 55 and an inner ring 56 downstream of the circular fuel distribution pipes 38 and 41. As shown in cross section in Figures 4, 9 and 10, each ring comprises a pair of concentric spaced walls 57 and 58 rigidly connected by a continuous transverse trough shaped common member or connecting wall 61 which divides the compound gutter into a downstream facing combustion gutter or trough 62 and an upstream facing carburetion gutter or trough 63. As also best shown in these same figures, the upstream ends of the walls 57 and 58 of this embodiment are turned inwardly toward each other at 64 and 65. The outer and inner rings 55 and 56 are connected by four equiangularly spaced radial compound gutters 66 of similar cross section, that lie directly downstream of the vertical and horizontal fuel distribution pipes 36 and 37. Where the radial compound gutters 66 intersect the circular gutters 55 and 56 the radial and circular combustion gutters 62 are in full open communication because the intervening walls 57 and 58 of the circular gutters are cut away at these points as best shown in Figure 4. However the radial and intersecting circular carburetion gutters 63 do not communicate, the radial gutters 63 being closed at their ends 67 as shown in Figure 4.

Those portions of the vertical and horizontal fuel distribution pipes 36 and 37 upstream of the radial compound gutters 66 in one embodiment of my invention have downstream directed fuel discharge openings 68 (Fig. 4) that discharge pilot fuel downstream into the carburetion gutter sections of the compound gutters 66. In this embodiment the circular pipes 38 and 41 also have downstream directed fuel discharge openings 71 (Figs. 4, 9 and 10) that discharge pilot fuel into the circular carburetion gutters 63. This fuel is target atomized when it strikes common members 61 in the compound gutters system that divide the carburetion gutter from the combustion gutter. These members 61 have openings 72 therethrough to permit the passage and impacting of the atomized fuel against walls 57 and 58 and into the combustion gutter where it burns to form an igniting and combustion sustaining flame. Instead of projecting the pilot fuel downstream, openings 68 and 71 may also be arranged to discharge the pilot fuel upstream so that it is carried by the high velocity gases into the carburetion gutters, giving adequate pre-combustion mixing time and improved high altitude operation as described in subsequent embodiments, but in such case the fuel distribution grid is preferably spaced further upstream from the carburetion gutter.

In the embodiment of Figures 3, 4, 9 and 10 with the principal dimensions in inches as shown in the drawings, the distance between the upstream edge of the carburetion gutter and the centerline of the fuel distribution pipes 36, 37, 38, 41 and 42 has been, by way of example, varied from about ¼ inch to somewhat over an inch. However, where the fuel distribution grid discharges all of the fuel directly upstream and none of the fuel directly into the carburetion gutters, as in the later described embodiment, the most effective distance between the centerline of the pipes forming the fuel distribution grid and the top or upstream edge of the carburetion gutter has been found to be about 1¾ inches. As will be explained, the latter spacing has been found to be more effective at relatively high altitudes in the neighborhood of 42,000 feet and above.

Since the exhaust gases are traveling through the shell 25 at speeds of over 300 miles per hour, a portion thereof enters the carburetion gutter wherein it circulates turbulently and mixes thoroughly with the atomized fuel within the gutter, thereby also preheating the fuel, and the mixture passes through the openings 72 into the combustion gutter striking against the hot walls 57 and 58 by reason of the inclination of the connecting wall 61 and the holes 72.

A pair of spark plugs 73 and 74 are mounted in reinforced sections of the shell 25 adjacent the bottom thereof, one on each side of fuel pipe 53, with their electrodes extending into the combustion gutter of the outer ring 55, as shown in Figs. 3, 5, 6 and 7. These spark plugs are one example of means which can be used to ignite the mixture in the combustion gutter, which once ignited, continues to burn and provide a pilot flame until the fuel supply to the fuel distribution grid 34 is cut off. To provide a richer mixture to the combustion gutter adjacent the spark plugs 73 and 74, additional holes 75 (Fig. 6) are provided in the wall 61 adjacent each spark plug. These holes 75 are preferably about one-half of the diameter of the holes 72 which are substantially one-eighth of an inch in diameter. This provides rather slower movement and more turbulence in the carburetion gutter, allowing for greater recirculation and a longer time for the particles within the gutter than at other locations remote from the spark plug. Too much draft occurs with the standard ⅛ inch holes to provide suitable conditions for ignition by the miniscule spark, but once initiated, the flame will ignite the gases throughout the combustion gutter. Other ignition means may be substituted for the spark plug ignition, however. This may be accomplished for example by a hot or incandescent wire, or by injection of sufficient raw gasoline in the engine combustion chamber, forward of the turbine wheels in the manner disclosed in said Patent No. 2,636,344, to initiate an igniting flame which is carried downstream effectively and substantially instantaneously igniting the pilot fuel mixture in my improved device when used as an afterburner.

Figure 8:
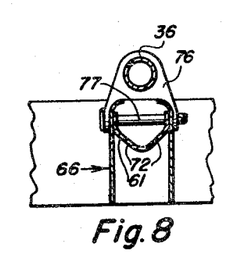
Figure 8 is a sectional view on line 8—8 of Figure 3.
Figure 9:
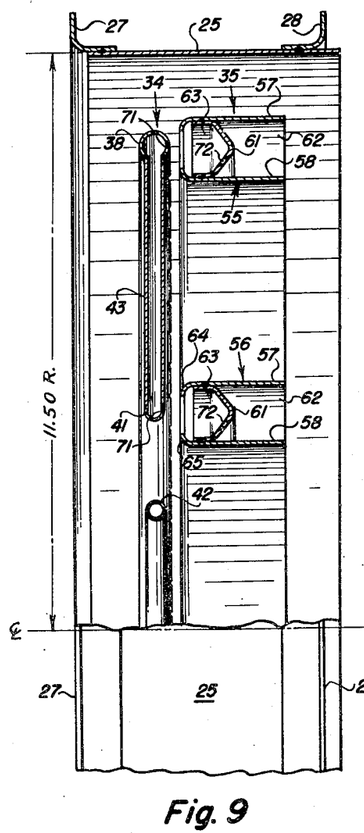
Figure 9 is a sectional view on line 9—9 of Figure 3.

The grid formed by the compound carburetion and combustion gutter will become very hot because of the flame within the combustion gutter, while the fuel distribution grid 34 will remain considerably cooler since it is cooled by the liquid fuel during afterburner operation. The compound gutter grid 35 is mounted upon the fuel distribution grid in such manner as to allow relative differential expansion and contraction therebetween. This is accomplished as by means of pairs of yokes 76 (Figs. 3, 4 and 8) that have a sliding fit on pipes 36 and 37 of the fuel distribution grid. The yokes extend toward and embrace the outer walls of the radial compound gutters 66, to which they are rigidly secured by through pins 77. It will be noted by a close inspection of Figures 3, 4 and 9 that the outer circular fuel distribution pipe is not directly over the center of the carburetion gutter of the ring 55, but is a little larger in diameter. Similarly, pipe 41 is not directly over the ring 56, but not displaced as much. Such displacements are the normal condition when the afterburner is at ambient temperature, with the main combustion engine 21 not operating. When my improved burner is operating as an afterburner, the compound gutter 35 is heated to a much higher temperature than the fuel distribution grid 34, and under these conditions the pipes 38 and 41 will be directly over the centers of the carburetion gutters of rings 55 and 56, it being understood that when used as an afterburner my improved device is never operated unless the engine 21 is already operating to provide a high velocity blast of exhaust gases in the tail pipe and through the afterburner. It will be understood, however, that my device may be used as a primary jet or ramjet burner.

Figure 10:
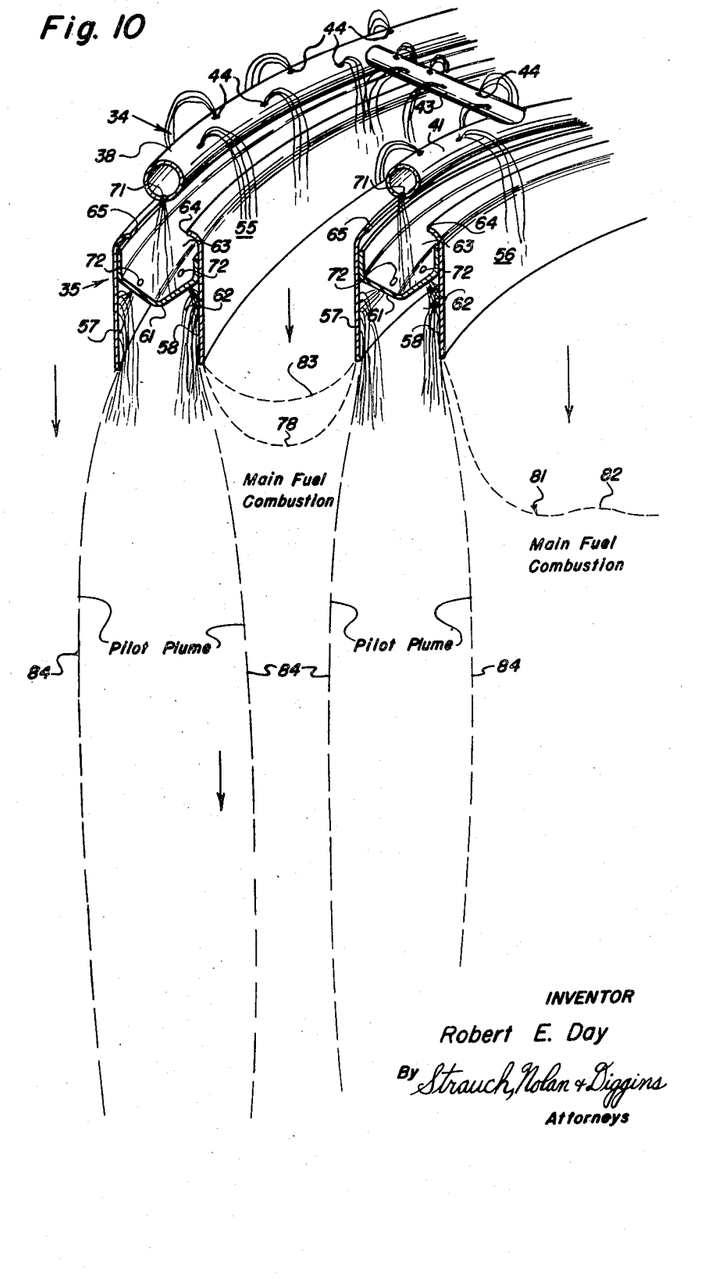
Figure 10 is a perspective view of a portion of the fuel distributor and gutter system, and also showing the general flame pattern produced by the burner.
Figure 11:
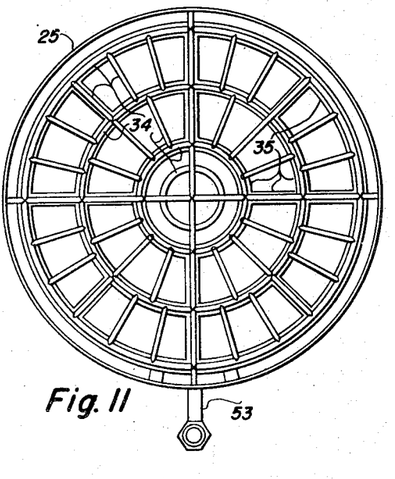
Figures 11, 12, 13 and 14 show several variations of fuel distributor grid and gutter grid.
Figure 12:
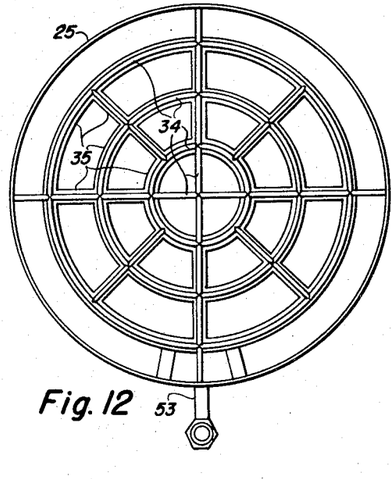
Figure 13:
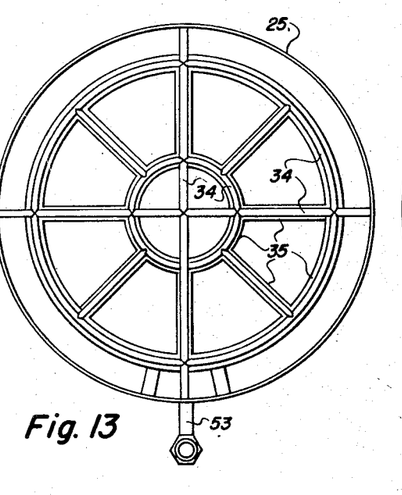
Figure 14:
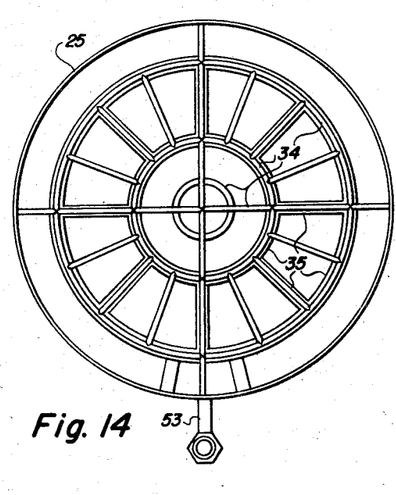

In my improved construction the primary fuel or fuel used in addition to the pilot fuel is mixed with the high velocity gases in a plurality of separate mixing and igniting zones bounded by the grid structures. This may be accomplished by delivering it in upstream jets as well as downstream jets. The upstream jets as indicated in Figure 10 mix with the gases before and while passing the fuel supply grid. Atomization and vaporization of the downstream directed jets results primarily from their impingement upon the hot surface of the connecting wall 61 of the carburetion gutters, while atomization of the fuel from the other jets results both from gas and target impingement and heating. Thus, the pilot fuel is atomized and mixed with the other gas and fuel mixture before passing through the openings 72 into the combustion gutter. This provides a desirable stratification and distribution with extended pre-heating, mixing and atomization of the fuel prior to ignition and combustion. The carbureted pilot gas and vapor mixture issues from holes 72 and, ignited by the spark plugs, impinges upon the inner faces of walls 57, 58 and 61, being heated considerably by these walls. Advantages of the carburetion gutter 63 are that it assures greater preheating of the fuel prior to its entrance into the combustion gutter; more intimate mixing by entrainment in passing through the holes 72; a greater time delay allowing for more intermolecular regrouping, and greater uniformity of combustible material within the combustion gutter. My improved arrangement also overcomes undesirable fuel distribution due to gustiness in the gaseous stream or slight inaccuracies in the drilling of holes, which occurs for example, even in the structure of application Serial No. 12,246.

A portion of the vaporized mixture may also circulate out of the upstream lips or turned in portions 64, 65 of the carburetion gutter and trail down along the outer faces of the walls 57 and 58. A portion of this overflow recirculates in the combustion gutter 62 adding turbulence to the streams from openings 72 and, in recirculating, further heats the walls 57, 58 and common member 61 thereby providing a hot target for the initial spray from the fuel distribution grid 34 and a secondary target for the spray from the holes 72. The jets from holes 72 provide a very steady initial pilot flame as a basis for the buildup of the turbulent flame of gases entering around the downstream lips. Since the holes 72 are relatively large and the vapor is forced through them under a comparatively low head, these holes do not tend to become plugged with carburetion sediments as do smaller jets under higher vapor pressure.

Also unlike a flame heated fuel vaporizer coil, this system is less likely to pulse due to the building up of vapor pressures in the manifold, in that the carburetion gutter 63, facing upstream, is open. Those skilled in the art are fully aware of the pulsing effects which may take place in a liquid fuel burner when the fuel in closed system is not fully vaporized and occasionally liquid issues with far greater mass flow and heat potential. This greater heat may then produce full vaporization and thus limit the mass flow and B. t. u. output of the burners until liquid issues again.

The compound gutter assures that the jets or spray directed downstream from the fuel distribution grid will be atomized even though the fuel jets or sprays might be slightly deflected from a true downstream direction, since the carburetion gutter forms a fairly wide pocket. In the subject disclosure, any vapor or droplets which pass around the upstream lips 64—65 are practically certain to stay relatively close to the walls 57 and 58 and of course the majority of the carbureted mixture passes through the uniformly spaced holes 72 and kindles a hotter initial flame within the gutter. The fact that the mixture overflowing the walls has already had considerable chance to vaporize and mature and the fact that these walls are very hot, conditions this fuel both for very rapid combustion once exposed to flame within the gutter as it recirculates and for the supplying of an intermediate zone of gases outside the gutter as the flame plumes build up. In the subject application, once the pilot flame is established, the heating and expansion within the gutter cause less mixture to be entrained from around the lower lips and allow more of the gas of the adjacent zones to then be used in propagating the flame outwardly into the main exhaust stream.

The radial fuel lines 43 bridging the open areas between gutters seem to aid in building up the flame front pattern in those areas, particularly in growth of plumes outwardly from the gutters into the intervening spaces. This additional control is important in keeping gases remote from the gutters from remaining unburned too long and becoming overripe. The mixture flowing around the sides of and into the combustion gutter is richer, more fully mixed, warmer and more fully atomized than the portions central of the surrounding grid elements. The interconnected channels of the pilot flame holding grid 35 allows the pilot flame to travel practically instantly throughout the combustion gutter upon ignition by the spark plug, and when the burner is in full operation the flame across the mixing zones between the gutters is anchored to the pilot flame in the gutter, and with changes or pulsations of the gases entering the afterburner, the flame appears to adjust laterally between the sections of the combustion gutter rather than longitudinally toward the outlet. Thus the spaces within the grid 35 between the connected circular and radial combustion gutters may be defined as mixing zones which are bounded by pilot and combustion supporting flames.

Figure 10 shows as closely as is possible from observation, by means of dotted lines the general disposition of the main flame fronts between different portions of the combustion gutter of this embodiment. The combustion gutters themselves are substantially occupied by the pilot flame. The main flame, which comprises the burning mixture of unburned exhaust gases, fuel delivered upstream from the grid 34, and surplus air from the main engine 21, is anchored to the pilot flame, and its upstream flame front arches between adjacent portions of the several surrounding portions of the endless pilot flame, there actually being six endless interconnected pilot and combustion sustaining flames in the embodiment illustrated in Figure 3. In Figure 10 the upstream flame front between the concentric outer and inner compound gutters 55 and 56 is indicated generally by the dotted line 78. The upstream flame front within the annulus formed by the inner compound gutter 56 is indicated generally by the dotted line 81. Along this line 81 is indicated an upstream extending hump 82 that is caused by the smallest diameter circular fuel pipe 42, shown in Figure 3 but not shown in Figure 10. It is a characteristic of the upstream flame front that it is not arched downstream as much in the zones downstream of those fuel distributor pipes such as 42, 43 and the inner portions of 36 and 37, because these fuel pipes, extending into the open areas between gutters causes a disturbance resulting in a more rapid maturing of the mixture of exhaust gases and upstream sprayed fuel. For example, directly downstream of the fuel pipe 43 in Figure 10 the upstream flame front between gutters 55 and 56 will be approximately as indicated by the line 83 rather than the line 78. The pilot flame plumes will be generally as indicated by the dotted lines 84 and the main combustion proceeds between these plumes as indicated in Figure 10. It is to be understood that the exact location of the upstream and downstream flame fronts is not fixed, but is dependent upon varying factors such as the regularity of the velocity of the exhaust gas stream from the main engine 21 when used as an afterburner and uniformity of combustible material within the combustion gutters, uniformity of fuel discharged into the exhaust gases, both upstream and downstream, and the configuration and disposition of both the elements of the fuel distribution grid 34 and of the compound carburetion and combustion gutter 35.

The fuel directed upstream helps establish and maintain the upstream flame front in areas between and not far downstream of the combustion gutters or grid members forming the sheltered combustion zone. In the zone immediately adjacent the combustion gutters there results a richer, more fully mixed, warmer, and more fully atomized mixture than in the spaces between the gutters, which are fed primarily by the fuel from the upstream directed jets.

Fuel is supplied to and discharged from the fuel distributing grid 34 at such a rate that it remains liquid within the grid despite the fact that the temperature in the duct is approximately 1200 degrees F. This is important because the formation of vapor in the grid would cause a discharge of vapor and liquid and resulting rough and erratic burning. The holes in the fuel distributor are not substantially affected by soot or other components because they are washed out by the passing fuel, and there is no burning in this region because the flame cannot propagate itself upstream against the 300–400 M. P. H. or higher blast in the less well mixed and matured ingredients adjacent the distributor. It also allows the fuel grid to be made of smaller pipe offering less interference to air and gas flow than when fuel is supplied in vapor form.

The fuel distribution grid and associated gutter or flame holding grid provide both main and pilot fuel in a single system.

The grid formed by the compound gutter 35 provides for rapid kindling and spreading of the pilot flame throughout the sheltered zone within the combustion gutter, and this pilot flame is established throughout the system in about $\frac{1}{200}$ of a second, and before propagation of a flame into adjoining areas. The heating of this grid also results in hot target atomization of the downstream directed fuel jets and this is a favorable factor in flame growth. Impingement of the gaseous mixture against hot walls 57 and 58 as shown in Figure 10 performs a major function in initiating and sustaining combustion. Upon hitting the red hot walls a blue flame of singular stability is formed apparently stabilized by the hot metal. Another factor leading to the smooth buildup of the flame, particularly within the combustion gutter and through the entire burning area, is that both fuel entrance and spark plugs are located at the bottom, so that the initial incoming fuel flows into the grid system upwardly against gravity. This assures that the fuel starts squirting from the lowest holes first, thence successively upwards. The flame, likewise, starting at the bottom has a vertically upward component which tends to ignite the fuel in the upper reaches of the gutter system just as soon as it has arrived there and started to recirculate.

Another factor that tends to promote rapid build-up of flame throughout the combustion gutter is that fuel entering the gutter grid may eddy for several swirls in both combustion and carburetion gutters thus has ample time to mature. As previously mentioned, maturing may be defined as including the intimate mixing of fuel and oxidizer, and the activation and intermolecular association which may be considered as preceding combustion. It is probable that some particles swirl several times before reaching maturity and actually kindling. Since at the instant of spark plug or other ignition the gas swirling in the combustion gutter is in general very near the kindling point, flame courses through the gutters very rapidly, measured by the rate of flow of the initial fuel through the grid and its arrival at successive areas along the gutter. The fuel supply entrance is located adjacent the spark plug. The spark plug is energized at the same time as a quick opening valve in the fuel supply line, and the primary gutter flame or pilot flame pattern builds up as hereinbefore stated in about $\frac{1}{200}$ of a second. This is highly important in jet plane operation particularly in take-off and in combat, as well as in attempting to land for example on a carrier deck, where in event of wave-off immediate pick-up of power is essential. Failure of almost instant response of the afterburner in a wave-off during landing on a carrier or in a critical combat maneuver might well result in loss of the plane and pilot.

Some fuel from the upstream directed jets may rush by until the primary gutter flame builds up, may pass unburned downstream, and may become explosive before leaving the tail pipe, but the rapidly developing flame burning everything sufficiently mixed and burnable cannot progress downstream fast enough to catch up with such explosively maturing particles, if they should be momentarily present. As the flame builds up, heat plays a greater and greater part in the continued control of burning, even remote and downstream from the gutters. The heat of the gutter flame, and hot atomization on the gutter back prepare the oncoming fuel adjacent to the gutters for instant fire. Its heat in turn does the final step in preparing the next adjacent portion to kindle a little more slowly. Long pilot and combustion sustaining flame plumes, as illustrated in Fig. 10 are firmly anchored at the gutters or flame holders and adjust laterally, absorbing changes of the currents rather than pulsing longitudinally. The relatively long side walls 57 and 58 of the gutters or flame holders tend to straighten flows and turbulence and to stratify the pilot flame zones, while the bridging radial pipes tend to create some turbulence in the main fuel combustion zones between the pilot flame zones.

As hereinbefore stated in flame propagation in high velocity streams, roughness verging on low grade detonation, is believed to be produced by areas of unburned molecules becoming over mature and overripe before having come in contact with kindling flame which may occur at almost any point in a relatively unstable flame, and is not confined to points in advance of the flame front. In the applicant's burner the most mature portions of the main fuel stream arrive at maturity and kindling point adjacent the downstream lips of the gutters, and the other portions of the fuel successively come to the kindling point closely thereafter, so that there is no substantial break in the continuous chain reaction of particle combustion as soon as it is capable of ignition, and without allowing substantial parts of the mixture to overripen into a violently explosive mixture. As a result a relatively stable flame is propagated and destructive detonation and intolerable roughness due to low grade explosions within the flame itself are avoided. This is highly important in jet plane propulsion in which for example explosions not of sufficient magnitude to blow up the shell, but as hereinbefore pointed out with the roughness of a plumber's blow torch multiplied by approximately 900 areas, would be intolerable.

Figures 11 to 14 are diagrammatically illustrative of some of the other configurations and dispositions of elements of the grid 34 and of the compound gutter 35 which I have developed. In each of these figures the elements of the fuel distribution grid 34 are indicated by the reference number 34 and the elements of the compound gutter indicated by the reference number 35.

The various configurations shown in Figures 3 and 11 to 14 are illustrative and typical examples of a large number of modifications that have been developed either to provide improved fuel distribution and flame stability under differing conditions of capacity altitude range and operation, or to maintain equivalent stability with less structure, less frontal area, and less pressure loss through the grids, the latter being a factor of considerable importance during the large part of the time when a plane is in normal flight without afterburning. While the configuration shown in Figure 3 has been found to have the most desirable overall characteristics for present requirements, the other forms also have desirable characteristics. For example, in the forms of Figs. 12, 13 and 14 where the outer circular compound gutter 34 is of relatively smaller diameter, the walls of the converging combustion chamber 26 will run cooler, making it possible to use an insulating blanket surrounding the walls of this chamber instead of the outer shroud and cool air duct as disclosed in application Serial No. 12,246.

In the case of some configurations of fuel distribution grid, where the distance between adjacent pipes is relatively large, the angle of the holes in the fuel pipes with respect to the direction of the stream of gases may be increased so that the jets of fuel will be thrown farther through the space toward the adjacent fuel pipe. With increased fuel pressure in the fuel distribution grid the angle of the holes with respect to the direction of the stream of gases may be increased even to a full 90 degrees. It may also be desirable to have some of these holes at as large an angle as 90 degrees in any of the configurations, in order to assure that fuel be sprayed into the areas between the pipes.

As higher and higher altitudes are reached by airplanes as the result of new developments in both the airplanes and power plants, new problems arise, not encountered at lower altitudes. With increase in altitudes the ambient air is more rarified and afterburner operation is affected just as is the operation of the primary engine. One conclusion drawn from afterburner operation at high altitudes of 40,000 to 42,000 feet and above, is that at these altitudes, probably due to lower pressure, density and mass flow of the ambient air, optimum afterburner operation is not so dependent upon target atomization of fuel jets against the combustion gutter connecting wall 61 as the precombustion mixing time of the fuel and combustion supporting gases. To obtain such increased precombustion mixing time, the fuel for the carburetion gutter is sprayed directly upstream instead of downstream for impingement into the carburetion chamber connecting wall. Improved operation at high altitudes has been attained thereby. Although the fuel jets from the fuel distributing grid 134 are directed generally upstream instead of downstream the flow of gases and the lessened pressure immediately downstream of the fuel distribution grid serves to carry a substantial portion of the upstream directed fuel into the carburetion gutters as illustrated for example in Figure 16 by the mixture flow lines. Besides changing the direction of fuel jets to generally upstream (angles of 15° from directly upstream being typical), other changes have been found to give relatively unexpected improved results. One change is that the distance between the centerline of the fuel distribution grid to the upstream lip of the carburetion gutter has been increased to 1.75 inches from the 1.075 inch distance previously considered maximum in the size of burner illustrated. Another change is that the upstream edges of the carburetion gutter are not turned inwardly as at 64 and 65 (Figs. 4 and 10). Instead, these upstream edges have been made straight or cocylindrical with the walls 57 and 58 of the combined carburetion-combustion gutter. A still further change is a substantial increase in the number of holes 72 through the wall 61 connecting the sides of the carburetion and combustion gutters. For example, referring to Figure 4, where three holes 72 are shown in one side of the wall of the radial gutter 63, the number has been increased from three to double (six), to triple (nine) that number. The fuel is sent upstream through drilled holes 138 in the grid 144.

In consequence to these changes a steadier burning is obtained, the flame plumes downstream of the afterburner are considerably lengthened, their heat is more effective in establishing cross flames downstream of the unguttered fuel distribution pipes, and the precombustion mixing time of the fuel and combustion supporting gases is lengthened. Although the fuel is sprayed upstream it loses velocity and is carried immediately downstream where it streams directly into the carburetion gutters assisted by the greater distance between fuel distribution pipes and carburetion gutters as well by the lower pressure due to turbulence downstream of the fuel distribution pipes which are not streamlined in cross section. That fuel which has not become atomized before it enters the carburetion gutter will become atomized upon striking the connecting wall 61.

Figure 16:
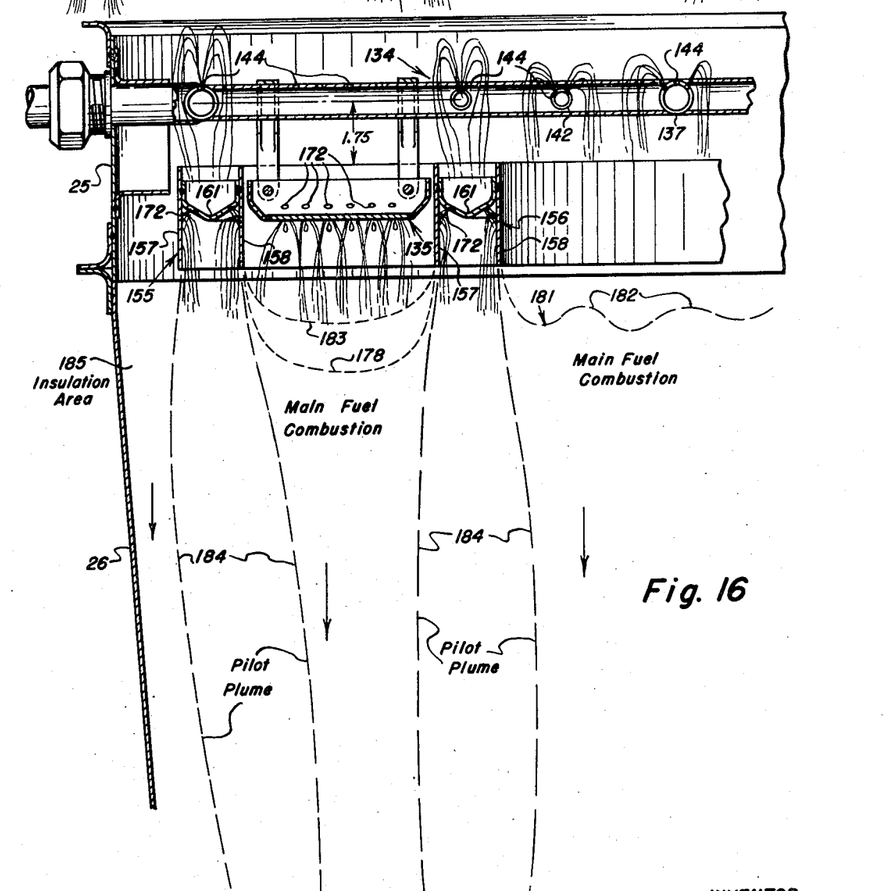
Figure 16 is a partial sectional view similar to Figure 4 but showing a modification preferred for high altitude or relatively low ambient air pressure operation.

Figure 16 shows a preferred embodiment which is particularly suitable for high altitude operations of say 40,000 feet and higher and is also completely satisfactory for lower altitude operation. Jet directions from grid 134 at 15° from directly upstream are typical of a satisfactory high altitude arrangement, and walls 157 and 158 of inner and outer rings 155 and 156 of the compound gutter system 135 are cylindrical and concentric. The centerline of the piping forming the fuel distribution grid 134 is preferably spaced 1.75 inches from the top or upstream edge of the compound gutter 135 in an afterburner of the size illustrated in Figures 3 and 4. The holes 172 through the trough shaped gutter connecting wall 161 are closer to the side walls 157 and 158 than in Figure 4, and their number is greatly increased. In the Figure 16 embodiment the upstream flame front between the concentric inner and outer gutters 155 and 156 is indicated generally by the dotted line 178. The upstream flame front within the annulus formed by the inner compound gutter 156 is indicated generally by the dotted line 181. Indicated along this line 181 are upstream extending humps 182 that are caused by the smallest diameter circular fuel pipe 142 and the inner portion of horizontal pipe 137, corresponding to pipes 42 and 37 of Figure 3. As explained in connection with Figure 10, it is a characteristic of the upstream flame front that it is not arched downstream as much in the zones downstream of those fuel distributor pipes extending into the open areas between gutters. For example the flame front under a radial fuel pipe 43 shown in Figures 3 and 10, not shown in Figure 16, would be generally as indicated by the dotted line 183 rather than by the line 178. The pilot flame plumes will be generally as indicated by the dash lines 184 and the main combustion proceeds between these plumes. The annular layer of relatively cooler exhaust gases, referred to hereinbefore, which pass between shell 25 and the grids to provide insulation is indicated at 185.

While only two types of compound gutter have been shown in cross section (in Figs. 4 and 16) it is to be understood that other configurations are within the scope of the invention, depending upon the use to which the burner is to be put. Three other forms are shown in Figures 17, 18 and 19 by way of example only.

Figure 17:
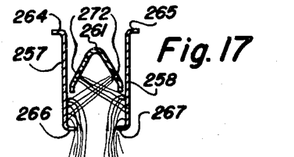
Figures 17, 18, and 19 show illustrative cross-sections of modification of compound gutter configuration which may be used under differing conditions of operation.

In Figure 17 the upstream ends of the side walls of the compound gutter have out-turned lips 264 and 265. The downstream ends have inturned lips 266 and 267. The connecting wall 261 is convex upstream instead of downstream so that the mixture passing the openings 272 has a longer path to travel before striking the hot side walls of the combustion gutter.

Figure 18:
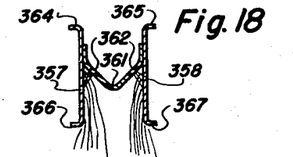

In Figure 18 the connecting wall 361 of the compound gutter is convex downstream but the upper and lower edges of the carburetion and combustion gutters have out-turned lips 364—365 and 366—367 respectively.

Figure 19:
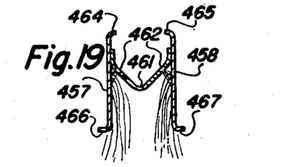

In Figure 19 the convex surface of wall 461 faces downstream, the upstream edges 464 and 465 of the walls 457 and 458 turn inward, and the downstream edges 466 and 467 turn outward.

The invention may be embodied in other specific forms without departing from the spirit or essential characteristics thereof. While shown as an afterburner mounted in airplane fuselage in Figures 1 and 2, my improved burner is adapted to various other uses such for example as a primary jet, anthodyd or gas turbine burner, a smoke generator, a very high capacity fuel burner, and the like, and it may be mounted in a wing or separately mounted nacelle or housing in accordance with the use to which it is put. The combustion and carburetion gutter and fuel distribution grid works and the fuel outlets and their detailed structures and arrangements may also be varied widely to meet particular operating conditions as will be apparent to those skilled in the art from the foregoing disclosures. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A burner comprising a duct having an inlet and an outlet for admitting and discharging gases at high velocity, said duct including a mixing zone adjacent said inlet and a combustion zone downstream of said mixing zone and adjacent said outlet; a distributor for adding and substantially evenly distributing fuel to the gases passing through the duct, comprising a first grid of spaced fuel supply pipes arranged in said mixing zone transversely of said duct, having outlets discharging fuel into said duct; and a second grid in said combustion zone, downstream of said first grid comprising a series of carburetion gutters disposed transversely therein with their open sides facing upstream, said second grid including a series of combustion gutters co-linear with said carburetion gutters but having their open sides facing downstream, said carburetion gutters having communicating means with said combustion gutters to permit fuel from said carburetion gutters to enter said combustion gutters.

2. The burner described in claim 1, wherein those fuel supply pipes in said first grid that are disposed upstream and co-linear with said carburetion gutters have outlets that discharge fuel solely toward said inlet.

3. In the burner described in claim 1, the pipes forming said first grid being of substantially cylindrical cross-section; and a series of peripheral radial supports having streamlined cross-sections connecting said first grid to said duct.

4. A burner comprising a duct having an inlet and an outlet for admitting and discharging gases at high velocity, said duct including a mixing zone adjacent said inlet and a combustion zone downstream of said mixing zone and adjacent said outlet; a distributor for adding and substantially evenly distributing fuel to the gases passing through the duct, comprising a first grid of spaced fuel supply pipes arranged in said mixing zone transversely of said duct, having outlets discharging fuel into said duct, and a second grid in said combustion zone, downstream of said first grid comprising a series of compound gutters disposed transversely therein downstream of some of the pipes, said compound gutters including co-linear gutters having their open sides facing upstream and downstream and a perforated wall forming a common bottom for said gutters.

5. A burner comprising a duct having an inlet and an outlet for admitting and discharging gases at high velocity, a fuel distributor in said duct operable to discharge fuel into said duct, and a compound gutter in said duct between said distributor and said outlet, comprising a transversely extending carburetion gutter having its open side facing said distributor and a perforated bottom wall, and also including a combustion gutter co-linear with said carburetion gutter, having its open side facing said outlet and said perforated wall forming the upstream wall of said combustion gutter.

6. In a burner for increasing the mass and velocity of a confined stream of gases moving at high velocity, a duct having an inlet and outlet for the gases; and a grid arranged transversely in said duct, comprising a carburetion gutter having its open side facing said inlet and having concentric cylindrical walls terminating in lips at their upper edges that turn in toward the gutter and toward each other, and a combustion gutter having its open side facing said outlet, said gutters having a perforated common wall providing communication therebetween.

7. In a burner for increasing the mass and velocity of a confined stream of gases moving at high velocity, a duct having an inlet and outlet for the gases; and a grid arranged transversely in said duct, comprising a carburetion gutter having its open side facing said inlet and having concentric cylindrical walls terminating in lips at their upper edges that turn away and outward from the cylindrical walls, and a combustion gutter having its open side facing said outlet, said gutters having a perforated common wall providing communication therebetween.

8. In a burner for increasing the mass and velocity of a confined stream of gases moving at high velocity; a duct having an inlet and an outlet for the gases; and a grid arranged transversely in said duct, comprising at least a pair of concentric carburetion gutters having their open sides facing said inlet, combustion gutters co-linear with said carburetion gutters, having their open sides facing said outlet and common perforated walls with said carburetion gutters to provide communication therebetween, and similar carburetion and combustion gutters extending between said concentric gutters.

9. In a burner for increasing the mass and velocity of a confined stream of gases moving at high velocity; a duct having an inlet and an outlet for the gases; and a grid arranged transversely in said duct, comprising a series of interconnected combustion gutters having their open sides facing said outlet end communicating with each other at their connections to form an endless combustion trough, and a series of carburetion gutters co-linear with said combustion gutters but having their open sides facing said inlet, and having a perforated bottom wall forming a common wall with said combustion gutters.

10. In the burner described in claim 9, a fuel distributor in said duct comprising a second grid of pipes arranged transversely in said duct between said inlet and said carburetion gutters, substantially coextensive with and overlying said carburetion gutters, and having means operable to discharge fuel into the duct.

11. In the burner described in claim 9, a fuel distributor in said duct comprising a second grid of pipes arranged between said inlet and said carburetion gutters, and having means operable to discharge fuel into the duct.

12. In the burner described in claim 9, a fuel distributor in said duct comprising a second grid of pipes arranged between said inlet and said carburetion gutters and having means operable to discharge fuel directly into said carburetion gutters as well as into the spaces between said carburetion gutters.

13. In the burner described in claim 9, a fuel distributor in said duct comprising a second grid of pipes arranged between said inlet and said carburetion gutters and having means operable to discharge fuel toward said inlet and away from said carburetion gutter in the regions between the carburetion gutter and the inlet, whereby the confined stream of high velocity gases in the duct mixes with them and blows them into the carburetion gutter.

14. A burner comprising a duct having an inlet and an outlet for admitting and discharging gases at high velocity, said duct including a mixing zone adjacent said inlet and a combustion zone downstream of said mixing zone and adjacent said outlet; a distributor for adding and substantially evenly distributing fuel to the gases passing through the duct, comprising a first grid of spaced fuel supply pipes arranged in said mixing zone transversely of said duct, certain of the pipes forming said grid having outlets discharging fuel downstream toward said combustion zone and others of said pipes having outlets discharging fuel upstream and away from said combustion zone; and a second grid in said combustion zone, comprising a series of carburetion gutters disposed transversely therein with their open sides facing those pipes in said fuel distributor having downstream facing outlets, said second grid including a series of combustion gutters colinear with said carburetion gutters but having their open sides facing downstream, said carburetion gutters having communicating means with said combustion gutters to permit fuel from said carburetion gutters to enter said combustion gutters.

15. A burner comprising a duct having an inlet and an outlet for admitting and discharging gases at high velocity, said duct including a mixing zone adjacent said inlet and a combustion zone downstream of said mixing zone and adjacent said outlet; a distributor for adding and substantially evenly distributing fuel to the gases passing through the duct, comprising a first grid of spaced fuel supply pipes arranged in said mixing zone transversely of said duct, certain of the pipes forming said grid having outlets discharging fuel downstream toward said combustion zone and others of said pipes having outlets discharging fuel upstream and away from said combustion zone; and a second grid in said combustion zone, comprising a series of compound gutters disposed transversely therein downstream of those pipes having downstream facing outlets, said compound gutters including colinear gutters having their open sides facing upstream and downstream and a perforated wall forming a common bottom for said gutters.

16. A burner as defined in claim 1, wherein said first and second grids are of sufficiently smaller diameter than said duct so that an annular passage is formed between said grids and said duct wherein a layer of the moving gases may pass unburned through said duct thereby insulating said duct from said combustion zone in the duct.

References Cited in the file of this patent

UNITED STATES PATENTS

| Number | Name | Date |
|---|---|---|
| 2,385,833 | Nahigyan | Oct. 2, 1945 |
| 2,468,461 | Price | Apr. 26, 1949 |
| 2,471,892 | Price | May 31, 1949 |
| 2,508,420 | Redding | May 23, 1950 |
| 2,552,851 | Gist | May 15, 1951 |
| 2,583,416 | Clark et al. | Jan. 22, 1952 |